US008685501B2

(12) United States Patent
Brice et al.

(10) Patent No.: US 8,685,501 B2
(45) Date of Patent: *Apr. 1, 2014

(54) CO-CONTINUOUS METAL-METAL MATRIX COMPOSITE MATERIAL USING TIMED DEPOSITION PROCESSING (75) Inventors: Craig A. Brice, Keller, TX (US); Bill Capshaw, Boerne, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1451 days.

This patent is subject to a terminal disclaimer.

(21) Appl. No.: 11/781,463

(22) Filed: Jul. 23, 2007

(65) Prior Publication Data

US 2007/0272053 A1 Nov. 29, 2007

Related U.S. Application Data (63) Continuation-in-part of application No. 11/523,333, filed on Sep. 19, 2006, which is a continuation-in-part of application No. 10/975,272, filed on Oct. 28, 2004, now abandoned.

(60) Provisional application No. 60/616,664, filed on Oct. 7, 2004.

(51) Int. Cl.
C23C 14/14 (2006.01)
(52) U.S. Cl.
USPC .......................... 427/597; 148/538; 148/220
(58) Field of Classification Search
USPC .................. 427/597; 148/538, 220
See application file for complete search history.

(56) References Cited

U.S. PATENT DOCUMENTS

| 4,902,359 | A | * | 2/1990 | Takeuchi et al. ............... 148/222 |
| 5,152,960 | A | | 10/1992 | Yuki et al. |
| 5,230,756 | A | | 7/1993 | Kawassaki et al. |
| 5,235,895 | A | | 8/1993 | Vanark et al. |
| 5,252,150 | A | | 10/1993 | Yuki et al. |
| 5,320,686 | A | | 6/1994 | Johansson et al. |
| 5,483,864 | A | | 1/1996 | Vanark et al. |
| 5,738,817 | A | * | 4/1998 | Danforth et al. ............... 264/603 |
| 5,837,960 | A | | 11/1998 | Lewis et al. |
| 6,046,426 | A | | 4/2000 | Jeantette et al. |
| 6,113,983 | A | | 9/2000 | Zachariah et al. |
| 6,168,833 | B1 | | 1/2001 | Leushake et al. |
| 6,221,173 | B1 | | 4/2001 | Shibuya et al. |
| 6,530,998 | B1 | | 3/2003 | Oofune |
| 6,878,415 | B2 | | 4/2005 | Downey |
| 6,884,466 | B2 | | 4/2005 | Kaloyeros et al. |

(Continued)

OTHER PUBLICATIONS

Pieters, R., et al., Particle Erosion Resistance of Laser Nitrided Ti-6Al-4V, Surface Engineering, Institute of Materials, London, GB, vol. 17, No. 2, Jan. 2001, pp. 159-162, ISSN: 0267-0844.

(Continued)

Primary Examiner — Weiping Zhu
(74) Attorney, Agent, or Firm — Bracewell & Giuliani LLP (57) ABSTRACT A direct manufacturing technique involving rapid solidification processing uses a reaction between a metallic molten pool and a reactant gas in an inert atmosphere to form alloys with improved desired properties. By utilizing rapid solidification techniques, solubility levels are increased resulting in alloys with unique mechanical and physical properties. Laser deposition of alloys in atmospheres of varying reactant content produce compositions with intermingled and significantly improved overall properties.

20 Claims, 4 Drawing Sheets (56) References Cited

U.S. PATENT DOCUMENTS 6,945,306 B2  9/2005  Duncan et al.
6,967,159 B2  11/2005  Vaartstra
8,389,072 B2 * 3/2013  Brice et al. .................... 427/597

OTHER PUBLICATIONS

Gazanion, F., et al., Improvement of Abrasive Wear REsistance of Titanium by Laser Gas Alloying in Nitrogen-Air Atmosphere, Canadian Metallurgical Quarterly, vol. 42, No. 2, Apr. 2003, pp. 235-244, SP009109449.

Bonss, S., Laser Gas Alloying of Titanium—New Possibilities for Severe Wear Loaded Components in Aerospace and Medicine, Progress in Heat Treatment and Surface Engineering, Jun. 2000, pp. 311-319, XP009109451.

Pieters, R.R.G.M., et al., TiN Formed by Laser Gas Alloying (LGA) of Ti-6A1-4V, Surface Engineering: Science and Technology I, Mar. 1999, pp. 415-428, XP009109452.

Hu, C., et al., Analysis of the Phases Developed by Laser Nitriding Ti-6A1-4V Alloys, ACTA Materialia, Elsevier, Oxford, GB, vol. 45, No. 10, Jan. 1997, pp. 5311-4322, XP009109459, ISSN: 1359-6454.

\* cited by examiner

CO-CONTINUOUS METAL-METAL MATRIX COMPOSITE MATERIAL USING TIMED DEPOSITION PROCESSING

This application is a continuation-in-part of U.S. patent application Ser. No. 11/523,333, filed Sep. 19, 2006, which is a continuation-in-part (CIP) of U.S. patent application Ser. No. 10/975,272, filed Oct. 28, 2004 now abandoned, which is based on U.S. Provisional Patent Application No. 60/616,664, filed Oct. 7, 2004.

BACKGROUND OF THE INVENTION

1. Technical Field

The present invention relates in general to forming metal alloys and, in particular, to a method for gas-phase alloying of metallic materials with timed deposition processing.

2. Description of the Related Art

Many metal objects are produced by thermomechanical processes including casting, rolling, stamping, forging, extrusion, machining, and joining operations. Multiple steps are required to produce a finished article. These conventional operations often require the use of heavy equipment, molds, tools, dies, etc. For example, a typical process sequence required to form a small cylindrical pressure vessel might include casting an ingot, heat treating and working the casting to homogenize it by forging, extrusion, or both, machining a hollow cylinder and separate end caps from the worked ingot and, finally, welding the end caps to the cylinder.

Conventional production methods are subtractive in nature in that material is removed from a starting block of material to produce a more complex shape. Subtractive machining methods are deficient in many respects. Large portions of the starting material are reduced to waste in the form of metal cuttings and the like. These methods also produce waste materials such as oils and solvents that must be further processed for purposes of reuse or disposal. Even the articles produced are contaminated with cutting fluids and metal chips. The production of such articles also requires cutting tools, which wear and must be periodically reconditioned and ultimately replaced. Moreover, fixtures for use in manufacturing must be designed, fabricated, and manipulated during production.

Machining is even more difficult when a part has an unusual shape or has internal features. Choosing the most appropriate machining operations and the sequence of such operations requires a high degree of experience. A number of different machines are needed to provide capability to perform the variety of operations, which are often required to produce a single article. In addition, sophisticated machine tools require a significant capital investment and occupy a large amount of space. In contrast, using the present invention instead of subtractive machining provides improved solutions to these issues and overcomes many disadvantages.

Another difficulty with conventional machining techniques is that many objects must be produced by machining a number of parts and then joining them together. Separately producing parts and then joining them requires close-tolerance machining of the complementary parts, provision of fastening means (e.g., threaded connections) and welding components together. These operations involve a significant portion of the cost of producing an article as they require time for design and production as well as apparatus for performing them.

Titanium has been used extensively in aerospace and other manufacturing applications due to its high strength-to-weight ratio. To increase the usefulness of titanium, various titanium alloys have been produced, many being tailored to provide desired characteristics. However, the equilibrium solute levels (as measured in weight-percent) in conventionally processed titanium alloys are below that which maximizes the beneficial effect of the solute.

For example, in concentrations over 500 ppm, nitrogen is typically considered a contaminant in titanium alloys. At levels higher than 500 ppm, the tensile strength increases greatly with a corresponding drop in tensile ductility. Additionally, solidification cracking can be a serious problem at high nitrogen levels. It is this embrittling effect that prohibits the use of nitrogen as a significant alloying agent.

Titanium alloys typically exhibit low wear resistance due to their low hardness. Under certain circumstances, titanium also can be subject to chemical corrosion and/or thermal oxidation. Prior art methods for increasing the hardness of titanium alloys have been limited to surface modification techniques. For example, a hard face coating is a discrete surface layer applied to a substrate and is subject to delamination. Current methods are also subject to macro and micro cracking of the surface-hardened layer. For example, U.S. Pat. Nos. 5,252,150 and 5,152,960 disclose titanium-aluminum-nitrogen alloys. These patents disclose an alloy that is formed through a solid-state reaction of titanium in a heated nitrogen atmosphere. The alloy is formed in a melt with aluminum to create the final alloy product.

Rapid solidification processes (RSP) also can be used to increase the amount of solute levels in alloys. In these processes, a rapid quenching is used in freezing the alloy from a molten state so that the solutes remain in desired phases. After quenching, diffusion may allow for dispersion throughout the material and agglomeration at nucleation sites, which further improves the desired characteristics of the alloy.

Creating metallic matrix composite structures with RSP is a difficult procedure that usually takes multiple complicated steps. Differences in material properties (e.g., yield strength, coefficient of thermal expansion, etc.) can make it very difficult to form a solid, fully dense structure without serious stress concentrations that can lead to cracking. While this type of process is used to form products such as powder, flake, or ribbon forms, it is unsuitable for manufacturing applications requiring material in bulk form. Thus, an improved metal alloy and process for producing the same would be desirable for many practical applications.

SUMMARY OF THE INVENTION

Embodiments of the invention use direct manufacturing techniques and timed gaseous alloying additions to form a metallic matrix composite structure in a single continuous operation. The method uses deposition processing and a timing circuit to introduce alloying agents into the deposit in a controlled or random manner as the structure is formed. This technique allows the creation of an alloy with domains of very high alloying content (e.g., nitrides, oxides, etc.) that are continuously intermingled with domains of low alloy content material using an automated and controlled procedure.

For example, a gaseous alloying agent is introduced into a metallic deposition process to create an in-situ alloy reaction. This invention specifically addresses the need for controlling the gaseous alloying additions, which is necessary for achieving certain property requirements. In one embodiment, very high nitrogen additions result in high hardness and strength, though the brittle nature of the product can lead to cracking during processing. By introducing timed control of the nitrogen addition, domains of compliant, unalloyed material are formed contiguously around the high nitrogen domains. This procedure eliminates cracking while also retaining the hardness and strength benefits. The timing procedure can be ordered, random, or otherwise manipulated depending on the needs of the part being fabricated.

Co-continuous, metal-matrix composites are typically formed using multiple step approaches where one porous material is infiltrated with another material. They also can be formed using bulk in-situ approaches, but these methods do not allow for control of second phase placement or quantity. In contrast, the invention uses reinforcing input material that is immediately regulated as the end product is formed. Thus, the invention has the advantages of requiring a single formation operation, and placement of the various material domains is tightly controlled due to the nature of the deposition process. This one-step, in-situ technique also reduces processing problems encountered in two-step methods, such as CTE mismatch issues and residual stress cracking. The invention is well suited for numerous applications including ballistic armor, wear resistant coatings, etc.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

The present invention is directed to a method for producing the novel compositions of matter comprising metal alloys. In one embodiment, the new alloys are well suited for use in aerospace applications that require a combination of high strength and low density. To enable formation of these new compositions of matter, one method of producing the alloys utilizes a solid freeform fabrication (SFF), or direct deposition, device to achieve rapid cooling and solidification while forming a bulk part.

Figure 1:
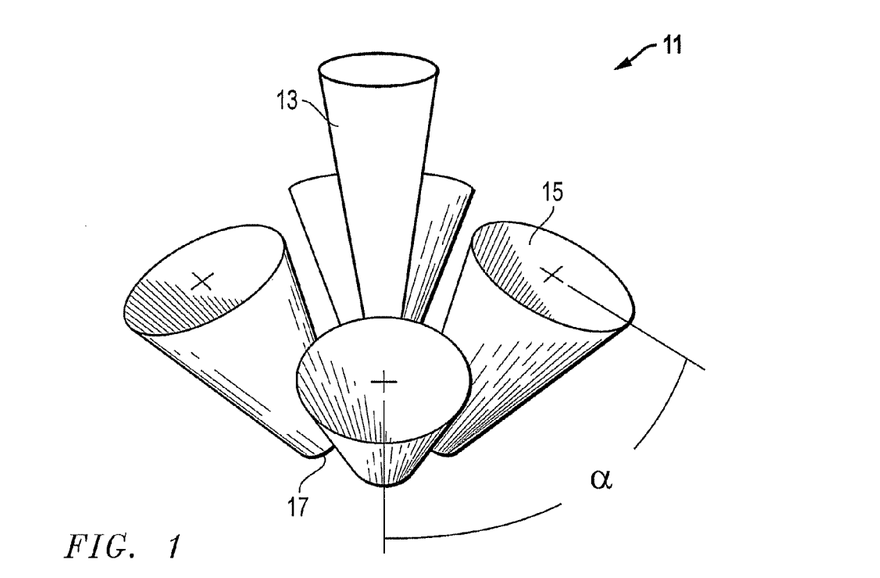
FIG. 1 is a schematic perspective view of one embodiment of a portion of a solid freeform fabrication device constructed in accordance with the present invention.

The alloys of the present invention utilize a rapid solidification process (RSP) to retain the desired metastable phases, and a method of direct manufacturing that results in rapid solidification is shown in the figures. FIG. 1 is a schematic, perspective view of a portion of a SFF device 11, such as is available from Optomec Design Company, Albuquerque, N. Mex., and sold under the trademark LENS™ (Laser Engineered Net Shaping).

Device 11 comprises a high energy density heat source, such as a laser beam 13. Other forms of heat sources may include, for example, electron beams and arcs. The laser beam 13 may be formed by various laser types and delivered to the desired location by fixed or fiber optics. Beam 13 acts as the heat source for melting a feedstock, such as a metallic powder or wire, for example. The feedstock may be positioned for alloying (e.g., on a platform), or delivered through one or more guide nozzle(s) 15. If nozzles are used, the feedstock exits the nozzles through outlets 17 at the lower ends of the nozzles.

In one embodiment, the heat source and nozzles are mounted to one or more movable platforms. In the laser embodiment, the controls may utilize optics to direct the laser beam 13. The platform also is computer-controlled to position the beam 13 and nozzles 15 in a desired location for each section or layer of the part being formed. In the illustrated embodiment, device 11 is shown as having four nozzles 15 located at 90° increments in an array having a selected radius from, and being centered on, beam 13. Though shown with four nozzles 15, device 11 may have more or fewer nozzles 15, and the nozzles 15 may be arranged in various orientations.

Figure 2:
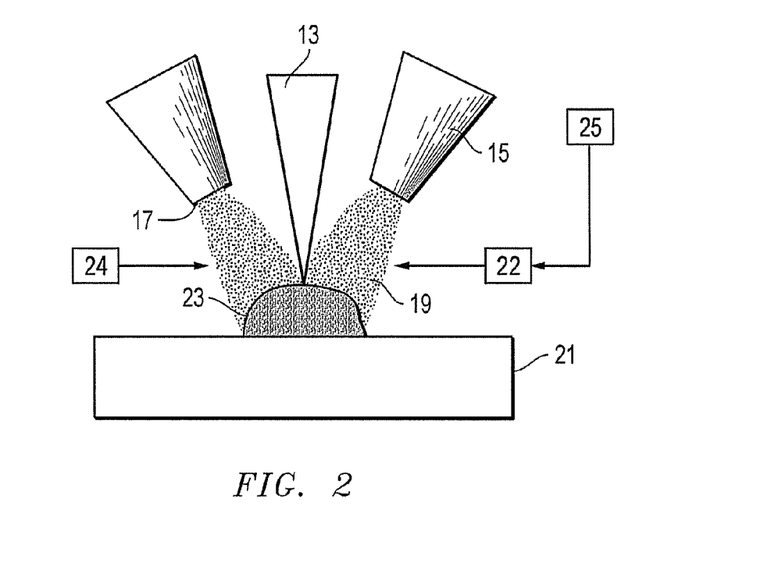
FIG. 2 is a schematic front view of the device of FIG. 1 during fabrication of a part, and is constructed in accordance with the present invention.

To form a part using the device 11, the metal or metallic alloy feedstock is presented, such as by delivery into and through the nozzles 15. As shown in FIG. 2, when, e.g., the powdered metal 19 is used as the feedstock, the metallic powder is entrained in an inert gas, typically argon, for delivery via the nozzles. The feedstock is carried out of the exit 17 of each nozzle 15 and directed at a point where the stream(s) of the metal 19 converge with the heat source. In one embodiment, the laser beam 13 melts the metal 19 to form a molten pool on the platform or substrate 21. The metal 19 is simultaneously exposed to a gaseous alloying element 22 (e.g., nitrogen, oxygen, carbon dioxide, etc.).

As one of or both the platform for the beam 13 and the nozzles 15 is/are moved the pool rapidly cools and solidifies as an alloy. When the heat source or beam 13 is moved away, a continuous line of the deposited alloy forms a portion of part 23. Device 11 is used to form adjacent, side-by-side layers to form the width of the part, and is used to form adjacent, stacked layers to create the height of part 23 (see, e.g., FIG. 3).

Figure 6:
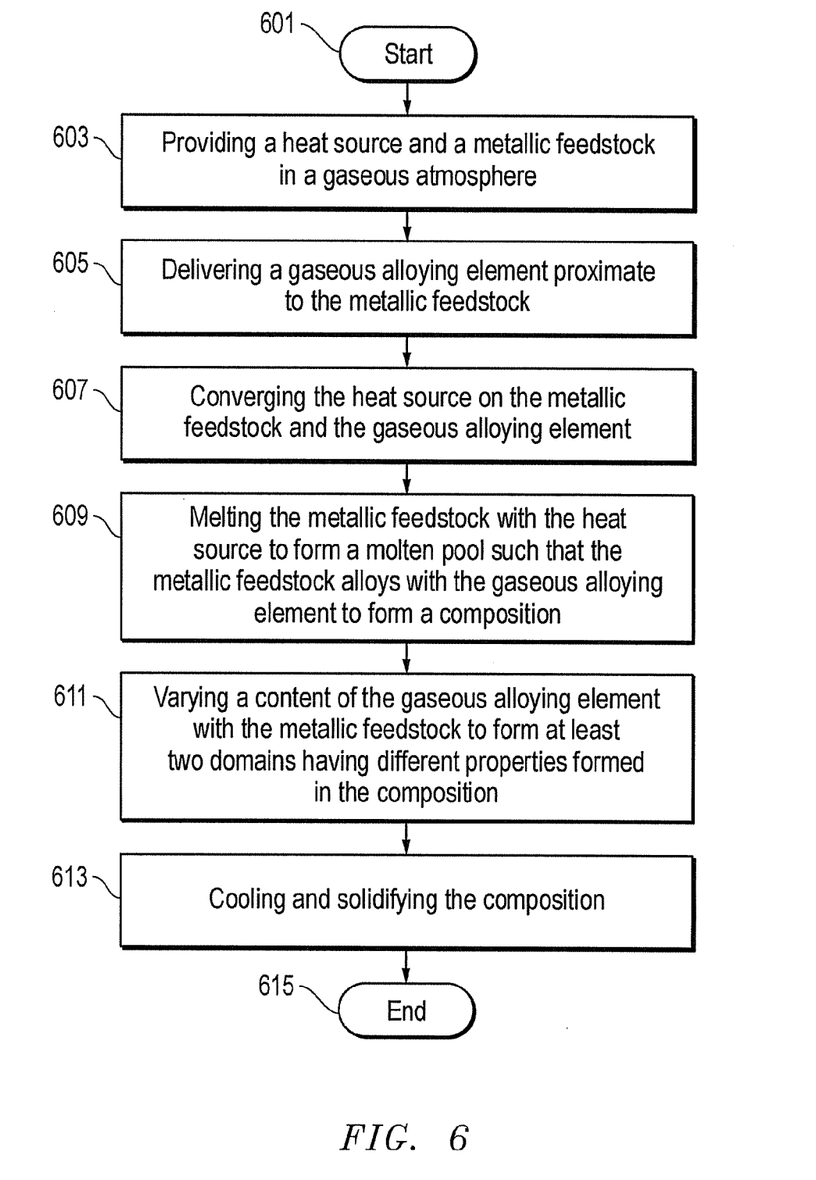
FIG. 6 is a high level flow diagram of one embodiment of a method constructed in accordance with the present invention.

In another embodiment (FIG. 6), one embodiment of the method starts as indicated at step 601, and comprises providing a heat source and a metallic feedstock in a gaseous atmosphere (step 603); delivering a gaseous alloying element proximate to the metallic feedstock (step 605); converging the heat source on the metallic feedstock and the gaseous alloying element (step 607); melting the metallic feedstock with the heat source to form a molten pool such that the metallic feedstock alloys with the gaseous alloying element to form a composition (step 609); varying a content of the gaseous alloying element with the metallic feedstock to form at least two domains 31, 33 (see, e.g., FIG. 3) having different properties formed in the composition (step 611); cooling and solidifying the composition (step 613); before ending as indicated at step 615.

The invention may comprise selectively timing a release of the gaseous alloying element with a timing circuit 25 (FIG. 2) to vary the content thereof in a controlled manner. Thus, the composition may be formed in a single continuous operation having at least two domains, such that said at least two domains are contiguously formed. In one embodiment, the method comprises sequentially utilizing one or more gaseous alloying elements (e.g., 22, 24) to form the composition.

Figure 3:
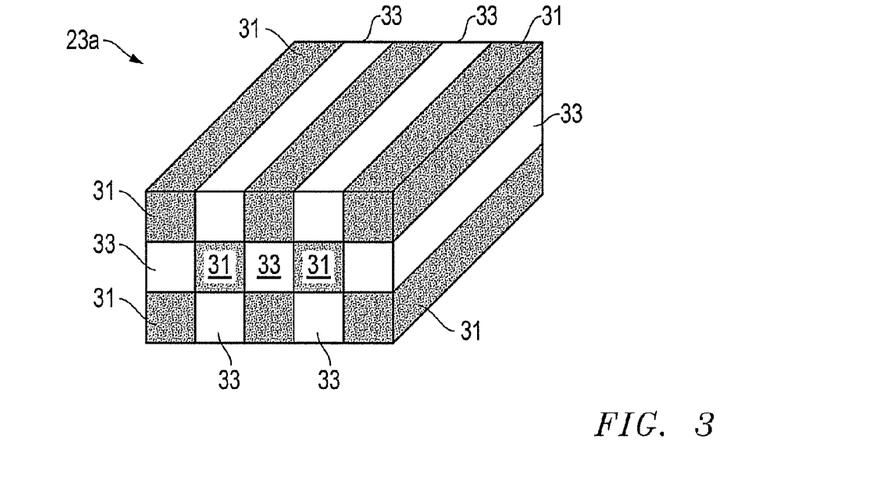
FIG. 3 is a schematic isometric view of one embodiment of a composition constructed in accordance with the present invention.

Referring now to FIG. 3, the two or more domains may comprise a first domain 31 having a high alloy content that is continuously intermingled with a second domain 33 having a low alloy content. For example, the first domain may be formed with a high hardness and strength, and the second domain may be relatively compliant compared to the first domain such that it is formed contiguously around the first domain. As shown in FIG. 3, the two or more domains may be formed in an ordered structure 23a such that the composition is symmetrical.

Figure 4:
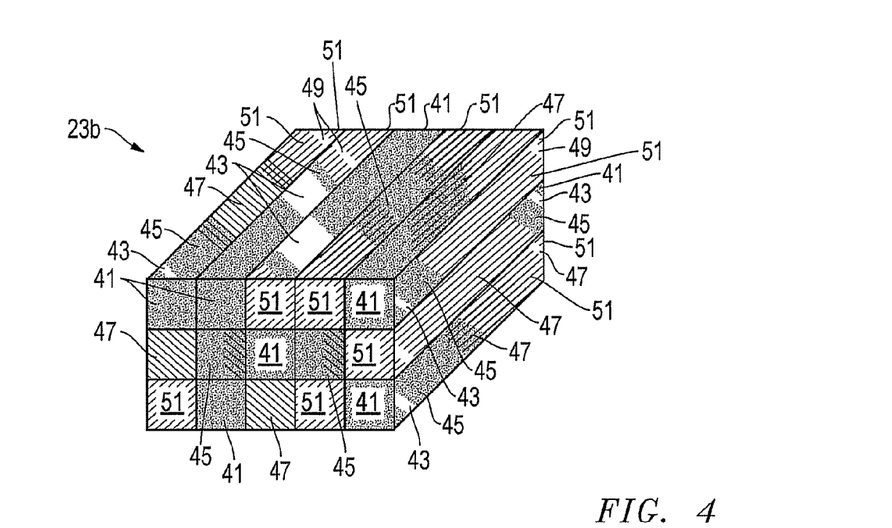
FIG. 4 is a schematic isometric view of another embodiment of a composition constructed in accordance with the present invention.

In another embodiment (FIG. 4), the content of the one or more gaseous alloying elements is substantially varied (e.g., randomly varied) to produce a plurality of domains 41, 43, 45, 47, 49, 51, some of which or none of which may be identical. For example, numerous domains may be used to form a non-uniform structure 23b such that the composition is non-symmetrical but has smooth gradient transitions (e.g., 45, 47) between said at least two domains (e.g., 41, 51). The smooth gradient transitions may be formed by continuously varying the content of the one or more gaseous alloying elements. In addition, abrupt changes in composition (e.g., 43, 49) also may be employed in accordance with the invention. In other embodiments, the gaseous atmosphere may comprise approximately 70% to 99.9% inert gas, and approximately 0.1% to 30% gaseous alloying element (e.g., nitrogen, oxygen, etc.).

used to keep the chamber at operating pressure and as a carrier gas for the powder delivery system.

In this embodiment, heat treatments were performed on some test samples in order to examine microstructural stability and thermal effects. Microstructural characterization was carried out using optical and scanning electron microscopy. Under equilibrium conditions, the solidification sequence for compositions under 1.2% N, which corresponds to about 7% atmospheric nitrogen, is:

And for equilibrium solidification at compositions greater than 1.9% N:

This solidification behavior is likely valid under equilibrium conditions and therefore not necessarily valid for laser deposited structures (i.e., due to rapid solidification characteristics). Rapid solidification tends to increase solid solubilities, which effectively shifts the phase diagram towards the solute end, thus favoring metastable phase formation. However, microstructural analysis is consistent with the above solidification sequences, though the composition limits may be uncertain. In one embodiment, the Ti alloy contains a weight percentage of N of approximately 0.05% to 3.0%.

Figure 5:
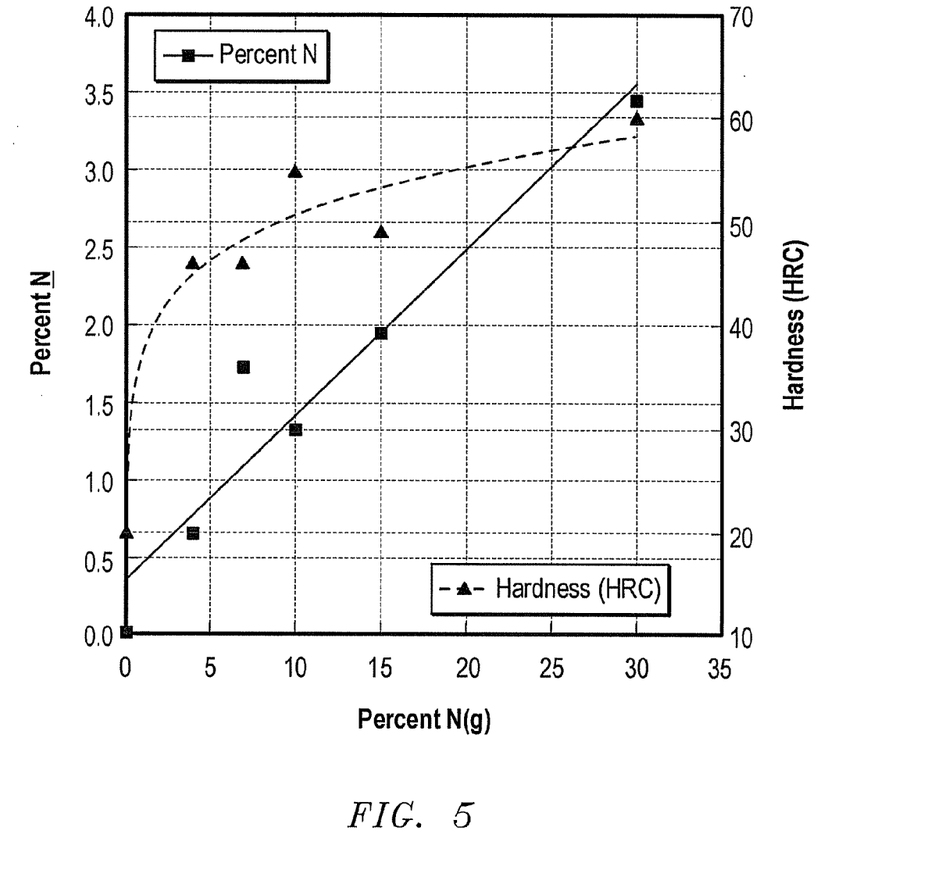
FIG. 5 is a plot of atmospheric nitrogen versus nitrogen absorbed and hardness in one embodiment of a composition of matter constructed in accordance with the present invention.

The chemistry results are shown in TABLE 1. Of interest here is the nearly linear relationship between atmospheric nitrogen and dissolved nitrogen in the as-deposited samples. This relationship is more clearly seen in FIG. 5, as are the plotted superficial hardness values. Here the relationship seems to follow a power-law relationship indicating that significant hardening benefits can be obtained at low concentrations while the effect diminishes at higher concentrations.

TABLE 1

| Element | CP-Ti | 4% N | 7% N | 10% N | 15% N | 30% N | Nominal | ASTM B348 |
|---|---|---|---|---|---|---|---|---|
| C | 0.0880% | 0.0980% | 0.0670% | 0.0870% | 0.0640% | 0.0910% | 0.0910% | 0.0800% |
| H | 0.0050% | 0.0018% | 0.0020% | 0.0012% | 0.0037% | 0.0038% | — | 0.0150% |
| N | 0.0200% | 0.6700% | 1.7300% | 1.3300% | 1.9400% | 3.4500% | 0.0080% | 0.0300% |
| O | 0.1700% | 0.1500% | 0.1440% | 0.1400% | 0.1470% | 0.1400% | 0.1250% | 0.1800% |

In one experiment, five different argon/nitrogen atmospheric combinations were evaluated in addition to a baseline 100% Ar CP-Ti. Custom mixed bottles of argon and nitrogen were mixed with the following ratios (Ar/N$_2$): 96/4, 93/7, 90/10, 85/15, and 70/30. Cp-Ti specimens were then laser deposited in each gas composition. Prior to deposition, an amount of the desired composition was purged through the system to ensure a homogeneous mixture at the target concentration. Another amount of the desired composition was TABLE 2 shows results from mechanical testing of the control CP-Ti specimens and the 96/4 and 90/10 compositions. The samples above 10% suffered cracking that prevented them from being tested. A small amount of nitrogen (as little as 0.1%) may result in gains in ultimate tensile strength on the order of 60% (i.e., as high as 140 ksi), and gains in hardness on the order of 100% (up to 55 HRC). Essentially no ductility was found in any of the nitrogen-modified samples.

TABLE 2

| Comp. | ID | Test Log | Temp. | UTS | 0.2% YS | % E | % RA | Mod. | Hard. |
|---|---|---|---|---|---|---|---|---|---|
| 10% | N4 | — | — | — | — | — | — | — | 55 |
| 10% | N5 | 980791 | RT | 33.3 | — | — | — | 18.6 | 55 |
| 10% | N6 | 980792 | RT | 28.4 | — | — | — | 18.5 | 55 |
|  |  |  | AVG | 30.9 |  |  |  | 18.6 | 55.0 |
| 4% | N26 | 980796 | RT | 137.9 | — | — | — | 17.2 | 46 |
| 4% | N27 | 980797 | RT | 155.5 | — | — | — | 17.3 | 48 |
| 4% | N28 | 980789 | RT | 139 | — | — | — | 17 | 47 |
|  |  |  | AVG | 144.1 |  |  |  | 17.2 | 47.0 |
| CP | N21 | 980793 | RT | 88 | 76.7 | 6.5 | 9.5 | 16.7 | 100 (23) |

TABLE 2-continued

| Comp. | ID | Test Log | Temp. | UTS | 0.2% YS | % E | % RA | Mod. | Hard. |
|---|---|---|---|---|---|---|---|---|---|
| CP | N23 | 980794 | RT | 88 | 74.6 | 23 | 31 | 16.7 | 97 (18) |
| CP | N24 | 980795 | RT | 81 | 73.2 | 5.5 | 13 | 16.7 | 98 (19) |
| | | | AVG | 85.7 | 74.8 | 11.7 | 17.8 | 16.7 | 98.3 (20.0) |

While the invention has been shown or described in only some of its forms, it should be apparent to those skilled in the art that it is not so limited, but is susceptible to various changes without departing from the scope of the invention. For example, other compositions of materials (e.g., aluminum-oxygen, carbon dioxide, etc.) may be utilized. Moreover, other alloys having a mixture range of 0.1 to 30% may be more suitable for other combinations of materials.

The invention claimed is:

1. A method of forming a part, comprising:
   (a) providing a base material, a heat source, and a metallic feedstock in a gaseous atmosphere;
   (b) delivering a gaseous alloying element proximate to the metallic feedstock;
   (c) converging the heat source on the metallic feedstock and the gaseous alloying element;
   (d) melting the metallic feedstock with the heat source to form a molten pool on the base material, such that the metallic feedstock alloys only with the gaseous alloying element to form a composition on the base material;
   (e) cooling and solidifying the composition to form a first layer directly on the base material, the first layer having different mechanical and physical properties than the base material, and the base material is not alloyed with the gaseous alloying element;
   (f) repeating steps (b)-(e) to form additional layers on the first layer and defining a shape for the part; and
   (g) while performing steps (b)-(f), selectively varying a content of the gaseous alloying element being delivered proximate to the metallic feedstock to form at least one first domain and at least one second domain, the first domain having a higher alloy content than the second domain.

2. The method according to claim 1, wherein step (g) comprises selectively timing a release of the gaseous alloying element being delivered proximate to the metallic feedstock with a timing circuit to vary the alloy content between the first and second domains in a controlled manner.

3. The method according to claim 1, wherein step (g) results in at least one of the first domains being contiguous with at least one of the second domains.

4. The method according to claim 1, wherein step (g) results in at least one of the first domains and at least one of the second domains being located within a single one of the layers.

5. The method according to claim 1, wherein step (g) results in at least one of the first domains and at least one of the second domains being located within at least two of the layers.

6. The method according to claim 1, wherein step (g) results in the first domain having a higher hardness than the second domain.

7. The method according to claim 1, wherein selectively varying in step (g) comprises continuously varying the content of the gaseous alloying element being delivered proximate to the metallic feedstock while forming at least one of the layers (par. 0032).

8. The method according to claim 1, wherein selectively varying in step (g) comprises randomly varying the content of the gaseous alloying element being delivered proximate to the metallic feedstock while forming at least one of the layers.

9. The method according to claim 1, wherein step (g) comprises results in at least one of the first domains being separated from at least one of the second domains within one of the layers by a smooth gradient transition.

10. The method according to claim 9, wherein the smooth gradient transition is formed by continuously varying the content of the gaseous alloying element being delivered proximate to the metallic feedstock.

11. The method according to claim 1, wherein the gaseous atmosphere is approximately 70% to 99.9% inert gas, and the gaseous alloying element being delivered proximate to the metallic feedstock comprises approximately 0.1% to 30% of the gaseous atmosphere.

12. The method according to claim 1, wherein the gaseous alloying element is selected from the group consisting of nitrogen and oxygen.

13. The method according to claim 1, wherein selectively varying in step (g) comprises abruptly changing the content of the gaseous alloying element being delivered proximate to the metallic feedstock.

14. A method of forming a part, comprising:
   (a) providing, laser heat source, a movable platform having a foundation material, and a metallic feedstock in a gaseous atmosphere;
   (b) delivering a gaseous alloying element proximate to the metallic feedstock on the foundation material;
   (c) converging the laser heat source on the metallic feedstock and the gaseous alloying element;
   (d) melting the metallic feedstock with the laser heat source to form a molten pool on the foundation material, such that the metallic feedstock alloys only with the gaseous alloying element to form a composition with the foundation material;
   (e) moving the composition via the movable platform and the heat source relative to each other, such that the molten pool rapidly cools and solidifies to form a first layer of deposited alloy on the foundation material, and the foundation material is not alloyed with the gaseous alloying element;
   (f) repeating steps (b) through (e) on top of the first layer to form a second layer on top of the first layer having different mechanical and physical properties than the first layer; and
   (g) while performing steps (a)-(f), varying a content of the gaseous alloying element being delivered proximate to the metallic feedstock to form at least two domains of the part having different alloy contents from each other.

15. The method according to claim 14, wherein said at least two domains comprise a first domain having a higher alloy content and a second domain that is contiguous the first domain and has a lower alloy content.

16. The method according to claim 14, wherein:
   said at least two domains comprise a first domain having a higher alloy content and a second domain having a lower alloy content; and
   a gradient transition between the first and second domains.

17. The method according to claim 14, wherein step (g) comprises forming the first and second domains in at least one of the layers.

18. The method according to claim 14, wherein step (g) comprises selectively timing the content of the gaseous alloying element being delivered proximate to the metallic feedstock.

19. The method according to claim 14, wherein:
the gaseous atmosphere is approximately 70% to 99.9% inert gas;
the gaseous alloying element comprises approximately 0.1% to 30% of the gaseous atmosphere; and
the gaseous alloying element is selected from the group consisting of nitrogen and oxygen.

20. The method according to claim 14, wherein varying a content in step (g) comprises randomly varying the content of the gaseous alloying element being delivered proximate the metallic feedstock.

* * * * *